United States Patent
Motoyoshi et al.

(10) Patent No.: US 9,120,228 B2
(45) Date of Patent: Sep. 1, 2015

(54) METHOD OF CONTROLLING ROBOT AND ROBOT

(71) Applicant: Seiko Epson Corporation, Tokyo (JP)

(72) Inventors: Masaki Motoyoshi, Shiojiri (JP); Tomokazu Hirabayashi, Hara (JP)

(73) Assignee: Seiko Epson Corporation (JP)

( * ) Notice: Subject to any disclaimer, the term of this patent is extended or adjusted under 35 U.S.C. 154(b) by 183 days.

(21) Appl. No.: 13/744,589

(22) Filed: Jan. 18, 2013

(65) Prior Publication Data
US 2013/0190926 A1    Jul. 25, 2013

(30) Foreign Application Priority Data
Jan. 20, 2012    (JP) .................................. 2012-009695

(51) Int. Cl.
  *B25J 9/16* (2006.01)
  *G01P 3/44* (2006.01)
  *G01P 21/02* (2006.01)

(52) U.S. Cl.
  CPC ................. *B25J 9/1653* (2013.01); *G01P 3/44* (2013.01); *G01P 21/02* (2013.01); *G05B 2219/40597* (2013.01)

(58) Field of Classification Search
  CPC ...... G01C 21/165; G01C 21/18; G01P 15/14; G01P 2015/086; G01P 21/02; G01P 3/44; G05D 1/027; G05B 2219/41123; G05B 2219/43018; G05B 2219/50056; B25J 9/1653
  USPC ....................................................... 700/254
  See application file for complete search history.

(56) References Cited

U.S. PATENT DOCUMENTS

| | | | |
|---|---|---|---|
| 5,198,663 A * | 3/1993 | Ichikawa et al. ............ | 250/231.1 |
| 7,451,633 B2 | 11/2008 | Bang et al. | |
| 2005/0156551 A1* | 7/2005 | Takenaka et al. ........ | 318/568.12 |
| 2006/0212193 A1* | 9/2006 | Breed .............................. | 701/29 |
| 2009/0177425 A1* | 7/2009 | Sugihara et al. ................ | 702/85 |
| 2010/0076639 A1* | 3/2010 | Shu ................................. | 701/23 |
| 2010/0318223 A1 | 12/2010 | Motoyoshi et al. | |
| 2012/0010748 A1* | 1/2012 | Sasai ............................ | 700/254 |

FOREIGN PATENT DOCUMENTS

| | | |
|---|---|---|
| JP | 01-173116 | 7/1989 |
| JP | 07-009374 | 1/1995 |
| JP | 09-006421 | 1/1997 |
| JP | 2001-033479 | 2/2001 |
| JP | 2006-227008 | 8/2006 |
| JP | 2010-247303 | 11/2010 |
| JP | 2010-284770 | 12/2010 |

* cited by examiner

*Primary Examiner* — Jerrah Edwards
(74) *Attorney, Agent, or Firm* — Harness, Dickey & Pierce, P.L.C.

(57) ABSTRACT

A method of controlling a robot includes the steps of calculating a torsional angular velocity of an arm using a difference between an angular velocity detected by a gyro sensor and an angular velocity in a gyro sensor coordinate obtained from information detected by a first encoder and a second encoder, calculating a correction amount of a sensitivity error of the gyro sensor using a variation in the torsional angular velocity, and correcting sensitivity of the gyro sensor using the correction amount of the sensitivity error.

13 Claims, 9 Drawing Sheets

METHOD OF CONTROLLING ROBOT AND ROBOT

BACKGROUND

1. Technical Field

The present invention relates to a method of controlling a robot, and a robot which acts using the method of controlling the robot.

2. Related Art

In the case of operating a robot, the rotational angle of an electric motor is detected using an angular sensor, and then the angular velocity is calculated based on the rotational angle to thereby control the operation. However, a transmission mechanism and an arm driven by the electric motor are not rigid bodies, and vibrations and torsion are generated with movement to hinder the accurate control in some cases.

Therefore, there has been proposed a robot, which calculates an amount of deflection of the arm using the acceleration detected by an inertial sensor disposed in a tip portion of the arm, and then adds the amount of deflection to the angular target value of an arm movement to thereby suppress the vibration of the arm (see, e.g., JP-A-1-173116 (Document 1)).

Further, there can also be cited the case in which it is attempted that the movement of a tip portion of an arm is detected with an inertial sensor, and the arm is driven using the detection signal of the inertial sensor to thereby make accurate positioning possible even with any vibration in the arm (see, e.g., JP-A-7-9374 (Document 2)).

In the Document 1 and Document 2 described above, the inertial sensor is disposed in the tip portion of the arm, and the movement (including the position) of the arm is controlled using the detection value of the inertial sensor. However, the sensitivity of the inertial sensor is expected to be degraded in accuracy due to the individual difference of the inertial sensor, an influence of the temperature variation, aging, and so on. There is a problem that the movement accuracy of the robot is degraded since the targeted control fails to be performed due to such degradation in accuracy of the inertial sensor as described above.

SUMMARY

An advantage of some aspects of the invention is to solve at least a part of the problems described above, and the invention can be implemented as the following forms or application examples.

Application Example 1

This application example is directed to a method of controlling a robot including a motor, an angular sensor adapted to detect a rotational angle of the motor, an arm connected to the motor, and an inertial sensor attached to the arm. The method includes calculating a torsional angular velocity of the arm using a difference between an angular velocity detected by the inertial sensor and an angular velocity in an inertial sensor coordinate obtained from angle information detected by the angular sensor, calculating a correction amount of sensitivity of the inertial sensor using the torsional angular velocity, and correcting the sensitivity of the inertial sensor using the correction amount.

Here, a gyro sensor can be cited as the inertial sensor, and an encoder, a resolver, and so on can be cited as the angular sensor.

Further, the inertial sensor coordinate is a coordinate system of expressing a position with reference to the position where the inertial sensor is mounted. It should be noted that the inertial sensor coordinate is hereinafter referred to simply as a sensor coordinate in some cases. Since the output value of the inertial sensor is the output value in the sensor coordinate system, the torsional angular velocity is calculated after converting the angular velocity information of the angular sensor into values in the sensor coordinate system.

According to this application example, the sensitivity correction amount of the inertial sensor is determined using the difference between the angular velocity detected by the inertial sensor and the angular velocity in the inertial sensor coordinate obtained from the information detected by the angular sensor. The angular velocity difference corresponds to the torsional angular velocity. The sensitivity of the inertial sensor is corrected using the sensitivity correction amount calculated in such a manner as described above, and thus the robot is operated. Due to the above, it is possible to reduce the influence of the individual difference of the inertial sensor and the temperature variation exerted on the accuracy, and the influence of the aging exerted on the accuracy degradation to thereby improve the accuracy of the movement of the robot.

Application Example 2

In the method of controlling the robot according to the above application example, it is preferable that the calculating of a correction amount is performed during a movement of the robot.

If the calculation of the sensitivity error is performed when the robot is at rest, it is possible that the noise component occurring when detecting the sensitivity is accumulated, and the sensitivity error becomes different from the actual value. Therefore, by calculating the correction amount of the sensitivity error only when the robot is in motion, it is possible to suppress the influence of the noise to thereby obtain the sensitivity correction amount with high accuracy.

It should be noted that it is determined that the robot is at rest in the case of the movement in which the inertial sensor has no angular velocity, or the movement in which the angular velocity fails to reach a certain level.

Application Example 3

In the method of controlling the robot according to the above application example, it is preferable that in the calculating of a correction amount, the torsional angular velocity is calculated at predetermined time intervals during a movement of the robot, and a correction amount of a sensitivity error is calculated from a sum of values of the torsional angular velocity, which have been calculated at the time intervals, after termination of the movement.

In the case in which, for example, one movement takes 600 ms until the termination thereof, the angular velocity is detected in the inertial sensor every 2 ms, and after the termination of one movement, the sum of the values of the torsional angular velocity detected every 2 ms is calculated to obtain the correction amount of the sensitivity error. By adopting this step, the variation in the torsional angular velocity can be obtained in substantially real time, and further by calculating the correction amount every one movement, the calculation load of the calculation step can be reduced.

Further, since the sensitivity of the inertial sensor continues to be updated while operating the robot, there is an advantage that the accuracy continues to be improved in every one movement in the case of performing a repeated movement.

Application Example 4

In the method of controlling the robot according to the above application example, it is preferable that in the calculating of a correction amount, a rotational direction of the motor is detected, and then a value of the torsional angular velocity is switched between plus and minus in accordance with the rotational direction.

In the calculation of the torsional angular velocity, there is no information related to the rotational direction. Therefore, the value of the torsional angular velocity thus calculated is switched between plus and minus in accordance with the rotational direction of the electric motor. According to this process, the sensitivity correction in both of the normal rotation and the reverse rotation of the arm on which the inertial sensor is disposed can be performed.

Application Example 5

In the method of controlling the robot according to the above application example, it is preferable that the method further includes eliminating an offset error of the inertial sensor, and the calculating of a torsional angular velocity is performed after the eliminating of an offset error.

By adopting this step, it is possible to eliminate the influence of the offset of the inertial sensor to thereby perform the correction of the sensitivity error with high accuracy.

Application Example 6

In the method of controlling the robot according to the above application example, it is preferable that in the calculating of a correction amount, the correction amount is calculated using a correction coefficient of the sensitivity of the inertial sensor corresponding to a magnitude of a movement speed of the robot.

By adopting this process, in the case in which the movement speed is high, it is possible to increase the correction coefficient to thereby increase the sensitivity correction amount, and in the case in which the movement speed is low, it is possible to decrease the correction coefficient to thereby decrease the sensitivity correction amount. It should be noted that the correction coefficient is calculated using, for example, the sensitivity correction gain of the inertial sensor.

Application Example 7

This application example is directed to a robot including a motor, an arm connected to and driven by the motor, an angular sensor adapted to detect a rotational angle of the motor, an inertial sensor attached to the arm, a torsional angular velocity calculation section adapted to calculate a torsional angular velocity of the arm using a difference between an angular velocity detected by the inertial sensor and an angular velocity in an inertial sensor coordinate obtained from information detected by the angular sensor, a sensitivity correction amount calculation section adapted to calculate a sensitivity correction amount of the inertial sensor, a sensitivity correction section adapted to correct sensitivity using the sensitivity correction amount calculated by the sensitivity correction amount calculation section, and a movement determination section adapted to determine movement of the arm.

According to this application example, the sensitivity correction amount of the inertial sensor is determined using the difference between the angular velocity detected by the inertial sensor and the angular velocity in the inertial sensor coordinate obtained from the angle information detected by the angular sensor. The angular velocity difference corresponds to the torsional angular velocity. The sensitivity of the inertial sensor is corrected using the sensitivity correction amount calculated in such a manner as described above, and thus the robot is operated. Due to the above, it is possible to eliminate the influence of the individual difference of the inertial sensor and the temperature variation exerted on the accuracy, and the influence of the aging exerted on the accuracy degradation to thereby improve the accuracy of the movement of the robot.

Application Example 8

This application example is directed to a method of controlling a robot including calculating a velocity of a sensor coordinate system using an acceleration detected by an acceleration sensor, calculating a distortion velocity from a difference between a velocity of a sensor coordinate system detected by a velocity sensor and a velocity of a sensor coordinate system calculated using the acceleration, calculating a correction amount of sensitivity of the acceleration sensor using the distortion velocity, and correcting the sensitivity of the acceleration sensor using the correction amount.

In the method of controlling the robot according to this application example, in contrast to performing the sensitivity correction of the inertial sensor (e.g., a gyro sensor) using the torsional angular velocity described above, the sensitivity correction of the acceleration sensor is performed using the distortion velocity and then the robot is operated. Due to the above, it is possible to reduce the influence of the individual difference of the acceleration sensor and the temperature variation exerted on the accuracy, and the influence of the aging exerted on the accuracy degradation to thereby improve the accuracy of the movement of the robot.

Application Example 9

In the method of controlling the robot according to the above application example, it is preferable that the calculating of a correction amount is performed during a movement of the robot.

If the calculation of the sensitivity error is performed when the robot is at rest, it is possible that the noise component occurring when detecting the sensitivity is accumulated, and the sensitivity error becomes different from the actual value. Therefore, by calculating the correction amount of the sensitivity error only when the robot is in motion, it is possible to suppress the influence of the noise to thereby obtain the sensitivity correction amount with high accuracy.

It should be noted that it is determined that the robot is at rest in the case of the movement in which the acceleration sensor has no velocity, or the movement in which the velocity fails to reach a certain level.

Application Example 10

In the method of controlling the robot according to the above application example, it is preferable that in the calculating of a correction amount, the distortion velocity is calculated at predetermined time intervals during a movement of the robot, and a correction amount of a sensitivity error is calculated from a sum of values of the distortion velocity, which have been calculated at the time intervals, after termination of the movement.

In the case in which, for example, one movement takes 600 ms until the termination thereof, the acceleration is detected in the acceleration sensor every 2 ms, and after the termination of one movement, the sum of the values of the distortion velocity detected every 2 ms is calculated to obtain the correction amount of the sensitivity error. By adopting this step, the variation in the distortion velocity can be obtained in substantially real time, and further by calculating the correction amount every one movement, the calculation load of the calculation step can be reduced.

Further, since the sensitivity of the acceleration sensor continues to be updated while operating the robot, there is an advantage that the accuracy continues to be improved in every one movement in the case of performing a repeated movement.

Application Example 11

In the method of controlling the robot according to the above application example, it is preferable that in the calculating of a correction amount, a translation direction of a mounting position of the acceleration sensor is detected, and then a value of the distortion velocity is switched between plus and minus in accordance with the translation direction.

In the calculation of the distortion velocity, there is no information related to the translation direction. Therefore, the value of the distortion velocity thus calculated is switched between plus and minus in accordance with forward and backward directions of the translation of the mounting position of the acceleration sensor. According to this process, the sensitivity correction in both of the forward translation and the backward translation at the position where the acceleration sensor is disposed can be performed.

Application Example 12

In the method of controlling the robot according to the above application example, it is preferable that the method further includes eliminating an offset error of the acceleration sensor, and the calculating of a distortion velocity is performed after the eliminating of an offset error.

In the initial state, the offset error exists in the acceleration sensor. The offset error is an error corresponding to a value other than "0" detected by the acceleration sensor at rest, and by eliminating the offset error in advance, the correction of the sensitivity error can be performed with high accuracy.

Application Example 13

In the method of controlling the robot according to the above application example, it is preferable that in the calculating of a correction amount, the correction amount is calculated using a correction coefficient of the sensitivity of the acceleration sensor corresponding to an absolute value of a movement speed of the robot.

By adopting this process, in the case in which the movement speed is high, it is possible to increase the correction coefficient to thereby increase the sensitivity correction amount, and in the case in which the movement speed is low, it is possible to decrease the correction coefficient to thereby decrease the sensitivity correction amount.

It should be noted that the correction coefficient is calculated using, for example, the sensitivity correction gain of the acceleration sensor.

Application Example 14

This application example is directed to a robot including a sensor coordinate velocity calculation section adapted to obtain a detection value of an acceleration sensor, and then calculate a velocity in a sensor coordinate system, a distortion velocity calculation section adapted to calculate a distortion velocity from a difference between a velocity detected by a velocity sensor and the velocity in the sensor coordinate system, a sensitivity correction amount calculation section adapted to calculate a sensitivity correction amount of the acceleration sensor, a sensitivity calculation section adapted to correct sensitivity of the acceleration sensor based on the sensitivity correction amount, and a movement determination section adapted to determine whether the robot is in motion or at rest.

According to this application example, the sensitivity correction of the acceleration sensor is performed using the distortion velocity, and the robot is operated. Due to the above, it is possible to reduce the influence of the individual difference of the acceleration sensor and the temperature variation exerted on the accuracy, and the influence of the aging exerted on the accuracy degradation to thereby improve the accuracy of the movement of the robot.

It should be noted that the robot according to this application example can also be applied to a linear motion robot, a three-axis robot, and a six-axis robot.

BRIEF DESCRIPTION OF THE DRAWINGS

The invention will be described with reference to the accompanying drawings, wherein like numbers reference like elements.

DESCRIPTION OF EXEMPLARY EMBODIMENTS

Some embodiments of the invention will hereinafter be explained with reference to the accompanying drawings.

First Embodiment

Configuration of Robot

Figure 1:
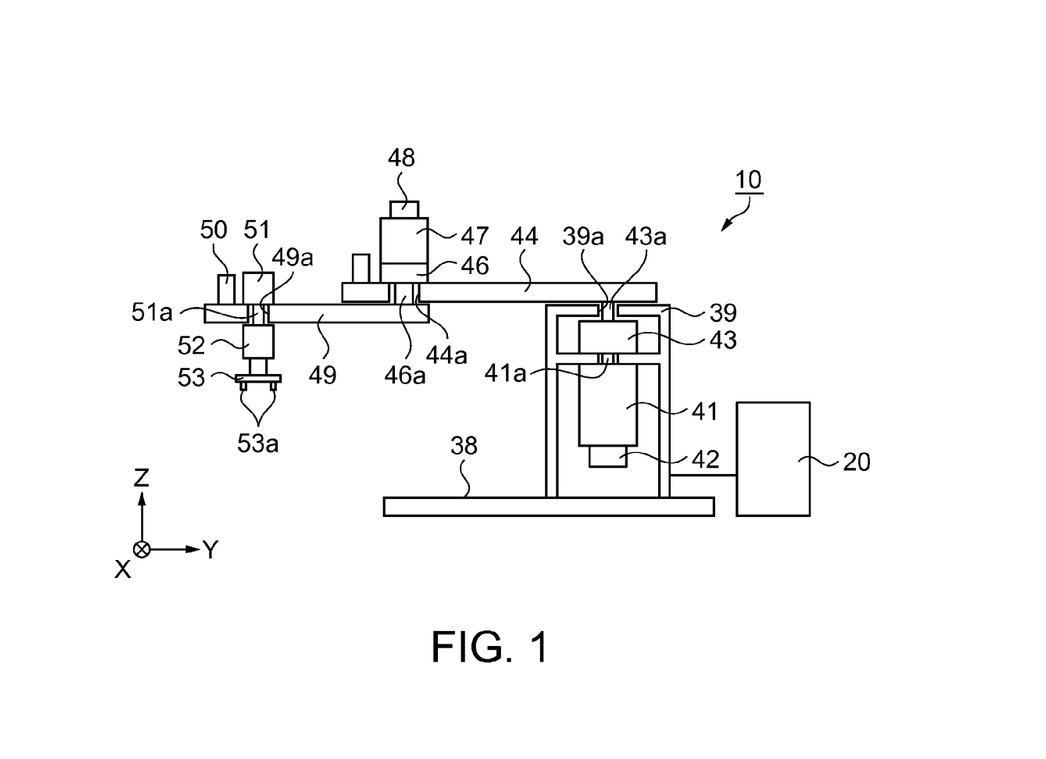
FIG. 1 is a constitutional explanatory diagram exemplifying a schematic configuration of a robot according to a first embodiment of the invention.

FIG. 1 is a constitutional explanatory diagram exemplifying a schematic configuration of a robot according to a first embodiment. It should be noted that FIG. 1 is a schematic diagram having contraction scales in the vertical and horizontal directions of each of the constituents or the parts different from the actual ones in order for making the constituents have recognizable sizes. Further, in the present embodiment, a three-axis robot (a scalar robot) is exemplified. In FIG. 1, the robot 10 is composed of a plurality of electric motors and arms connected to each other using a platform 38 having a plate shape as a base. A support frame 39 provided with a space is disposed on the platform 38.

In the lower space of the support frame 39, there is disposed an electric motor 41, and at the end portion in the axial direction of the electric motor 41, there is disposed a first encoder 42 as an angular sensor. The first encoder 42 detects the rotational angle of the electric motor 41.

In the upper space of the support frame 39, there is disposed a first reduction mechanism 43, and a rotating shaft 41a of the electric motor 41 is connected to the first reduction mechanism 43. On the upper side of the first reduction mechanism 43, there is projected an output shaft 43a, and the output shaft 43a is rotated at a rotational speed obtained by reducing the rotational speed of the electric motor 41 at a predetermined reduction ratio. As the first reduction mechanism 43, a variety of types of reduction mechanisms can be adopted, and in the present embodiment, a wave gear is adopted. The output shaft 43a is projected upward from the support frame 39 so as to penetrate a hole section 39a of the support frame 39.

One end portion of an arm 44 is connected to the output shaft 43a thus projected, and the arm 44 rotates in an X-Y plane taking the output shaft 43a as the rotational axis. To the other end portion of the arm 44, there are connected a second reduction mechanism 46 and an electric motor 47 so as to overlap each other, and at an end portion of the electric motor 47 in the rotational axis direction, there is disposed a second encoder 48 as an angular sensor. The second encoder 48 detects the rotational angle of the electric motor 47. Further, an output shaft 46a of the second reduction mechanism 46 penetrates a hole section 44a of the arm 44, and is projected from the arm 44. The output shaft 46a of the second reduction mechanism 46 rotates at a rotational speed obtained by reducing the rotational speed of the electric motor 47 at a predetermined reduction ratio.

As the electric motors 41, 47, a variety of types of electric motors can be used providing the rotational direction can be controlled by an electric signal. In the present embodiment, direct-current motors are adopted, for example. Since it is sufficient for the first encoder 42 to be capable of detecting the rotational angle of the electric motor 41, and it is sufficient for the second encoder 48 to be capable of detecting the rotational angle of the electric motor 47, a variety of types of rotary encoders can be used. In the present embodiment, optical rotary encoders are adopted, for example. One end portion of an arm 49 is connected to the output shaft 46a, and the arm 49 rotates in the X-Y plane taking the output shaft 46a as the rotational axis.

At the other end portion of the arm 49, there is disposed a gyro sensor 50 as the inertial sensor. Although the type of the gyro sensor 50 is not particularly limited, a vibration gyro sensor is adopted in the present embodiment. It should be noted that a three-axis gyro sensor is preferably adopted as the gyro sensor 50 in the present embodiment.

On the gyro sensor 50 side of the arm 49, there is disposed an electric motor 51, and a rotating shaft 51a of the electric motor 51 penetrates a hole section 49a of the arm 49, and is projected toward the platform 38. An elevating device 52 is connected to the rotating shaft 51a to thereby form a configuration in which the elevating device 52 can be rotated by the rotating shaft 51a.

At the lower end portion of the elevating device 52, a hand section 53 is disposed. The elevating device 52 has a linear motion mechanism, which moves vertically (in the Z-axis direction), and is thus capable of elevating the hand section 53. The hand section 53 has a plurality of finger sections 53a and a linear motion mechanism (not shown), and the linear motion mechanism is capable of changing the distance between the finger sections 53a. Further, it is arranged that the hand section 53 is capable of pinching and holding a work (not shown) as a work object between the finger sections 53a.

The robot 10 is provided with a control device 20 for controlling each of the drive systems described above. The control device 20 performs drive control of the electric motors 41, 47, and 51, and has a detection interface for the first encoder 42, the second encoder 48, and the gyro sensor 50, a calculation section for calculating the torsional angular velocity and a sensitivity correction amount based on the detection values of the first encoder 42, the second encoder 48, and the gyro sensor 50, and so on.

Subsequently, a configuration of the control device 20 will be explained.

Figure 2:
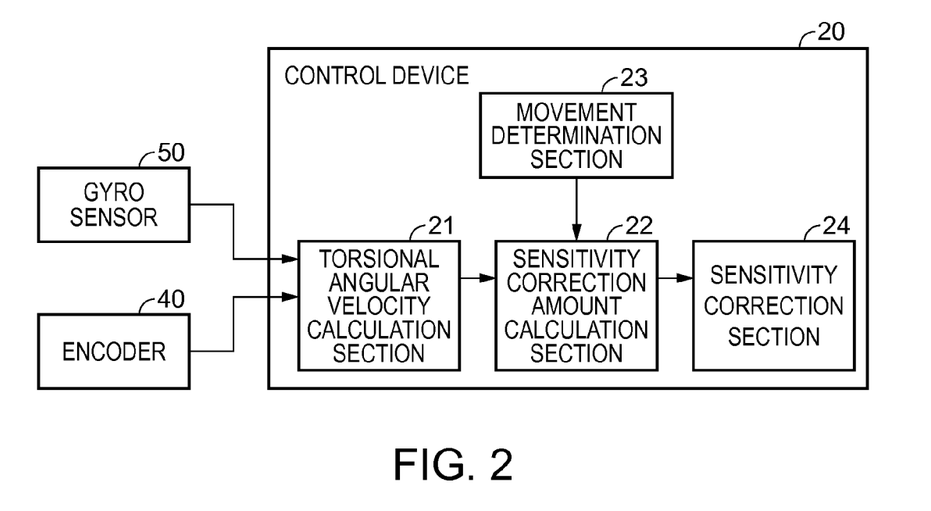
FIG. 2 is a constitutional explanatory diagram showing major constituents of a control device according to the first embodiment.

FIG. 2 is a constitutional explanatory diagram showing major constituents of the control device 20. The control device 20 is provided with a torsional angular velocity calculation section 21 for obtaining the detection value of the angular velocity of the gyro sensor 50, a detection value of the rotational angle of the electric motor 41 by the first encoder 42, and a detection value of the rotational angle of the electric motor 47 by the second encoder 48 via the interface (not shown), and calculating the torsional angular velocity, a sensitivity correction amount calculation section 22 for calculating a sensitivity correction amount of the gyro sensor 50, a sensitivity correction section 24 for correcting the sensitivity of the gyro sensor 50 based on the sensitivity correction amount thus calculated, and a movement determination section 23 for determining whether the robot 10 is in motion or at rest.

It should be noted that in FIG. 2, the first encoder 42 and the second encoder 48 are collectively referred to as an encoder 40.

Control Method of Robot

Then, a method of controlling the robot 10 will be explained. Firstly, a concept of the control method of the robot 10 will be explained with calculating formulas exemplified.

Here, the angular velocity detected by the gyro sensor 50 is expressed as a gyro output, and the angular velocity at the position where the gyro sensor 50 is disposed, which is calculated based on the angles detected by the first encoder 42 and the second encoder 48 is expressed as an encoder output.

The difference between the gyro output and the encoder output corresponds to the torsional angular velocity. It should be noted that "(gyro output)−(encoder output)" includes the torsional angular velocity of the movement, an offset error of the gyro sensor 50, and a sensitivity error of the gyro sensor itself. The torsional angular velocity is a vibrational component, and therefore has a difference depending on the movement, but becomes approximately "0" when taking an average in one movement.

Therefore, as calculating the sum of the "(gyro output)−(encoder output)" with the influence of the offset removed, the influence of the sensitivity error is figured out. By correcting the sensitivity error, the sensitivity correction of the gyro sensor 50 can be achieved. It should be noted that assuming that the angular velocity of the electric motor 41 calculated from the information of the first encoder 42 is J1, and the angular velocity of the electric motor 47 calculated from the information of the second encoder 48 is J2, the encoder output corresponds to the sum of J1 and J2, and therefore, "J1+J2" is expressed as the motor angular velocity in the following explanation.

This point will be explained with formulas.

(gyro angular velocity)=(motor angular velocity(J1+J2))+(torsional angular velocity)   (1)

The following formula is obtained by modifying the formula (I).

(torsional angular velocity)=(gyro angular velocity)−(motor angular velocity(J1+J2))   (2)

The formula 2 can be modified as follows.

(torsional angular velocity)=(torsional angular velocity)+(motor angular velocity(J1+J2))−(motor angular velocity(J1+J2))   (3)

Here, the calculated torsional angular velocity can be expressed as follows.

It should be noted that the gyro sensitivity is a value obtained by normalizing the actual value to 1, and ((gyro sensitivity)−1) represents the sensitivity error.

$$\begin{aligned}\text{(calculated torsional angular velocity)} &= \text{(gyro angular velocity)} - \text{(motor angular velocity } (J1+J2)) \\ &= ((\text{torsional angular velocity}) + \text{(motor angular velocity } (J1+J2))) \times \\ &\quad \text{(gyro sensitivity)} - \text{(motor angular velocity } (J1+J2)) \\ &= \text{(torsional angular velocity)} \times \text{(gyro sensitivity)} + \\ &\quad \text{(motor angular velocity } (J1+J2)) \times ((\text{gyro sensitivity}) - 1) \end{aligned} \quad (4)$$

The torsional angular velocity is a vibrational component, and therefore the average thereof in one movement becomes approximately "0" if no torsional component exists. Therefore, the first term of the formula 3 becomes "0," and the second term remains alone. Therefore, by performing the correction so that ((gyro sensitivity)−1) approximates to "0," the correct value of the gyro sensitivity can be obtained.

Subsequently, a relationship between the sensitivity error and the torsional angular velocity will be explained with reference to FIGS. 3A, 3B, 4A, 4B, 5A, 5B, 6A, and 6B citing the case in which no sensitivity error exists and the cases in which the sensitivity error exists. It should be noted that in each of FIGS. 3A, 4A, 5A, and 6A, the solid line represents the angular velocity (motor angular velocity (J1+J2)) calculated based on the information from the encoder 40, and the dotted line represents the angular velocity detected by the gyro sensor 50, and each of FIGS. 3B, 4B, 5B, and 6B shows the calculated torsional angular velocity, wherein the vertical axis represents the angular velocity (deg/s), and the horizontal axis represents time (sec). Further, the values of the calculated torsional angular velocity detected at predetermined time intervals (2 ms intervals are adopted in all of the cases in the present embodiment) are shown in the graph.

Further, in each of the drawings, it is assumed that a series of actions, namely an acceleration action performed from the beginning of the movement to the time point of 0.13 second, an action with a constant speed successively performed in the period from about 0.13 second to 0.2 second, an action of deceleration performed in the period from about 0.2 second to 0.3 second, and an action of stopping, correspond to one movement. For example, it is assumed that the action of moving the work from a point A to a point B corresponds to one movement.

First Case

Figure 3A:
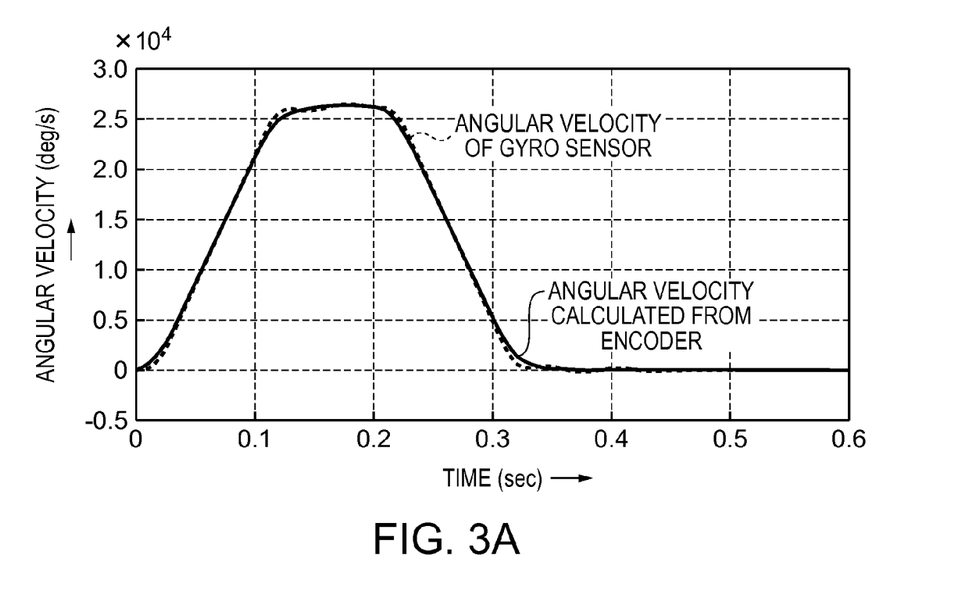
FIGS. 3A and 3B are diagrams showing data representing a relationship between a sensitivity error and a torsional angular velocity in a first case.
Figure 3B:
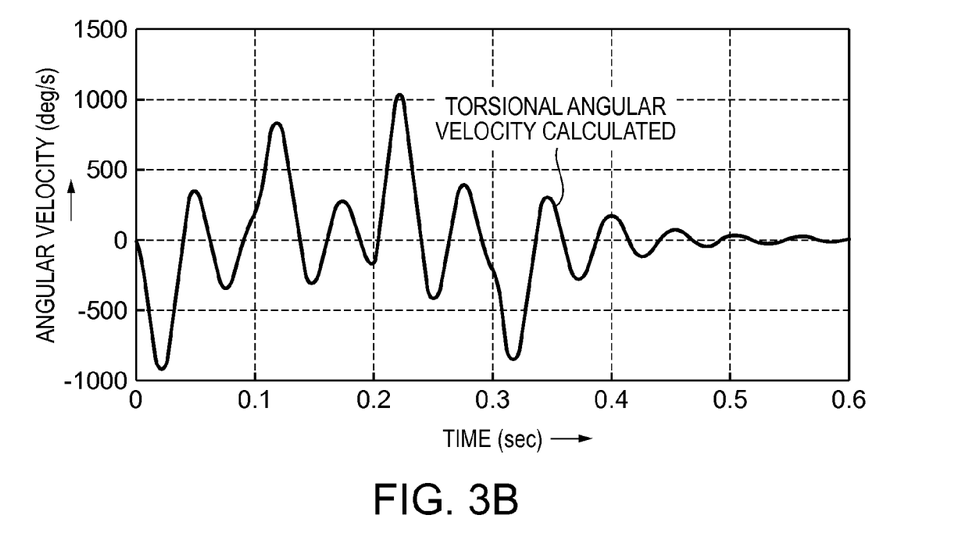

FIGS. 3A and 3B are diagrams showing data representing a relationship between the sensitivity error and the torsional angular velocity in a first case, and show the case in which the sensitivity error is approximately "0." In other words, the value of the angular velocity in the gyro sensor coordinate (referred to as the gyro coordinate in some cases) calculated from the encoder 40 as shown in FIG. 3A and the value of the angular velocity detected by the gyro sensor 50 are roughly equal to each other. In this case, as shown in FIG. 3B, the sum of the torsional angular velocity values calculated using the formula 3 described above becomes approximately "0."

Second Case

Figure 4A:
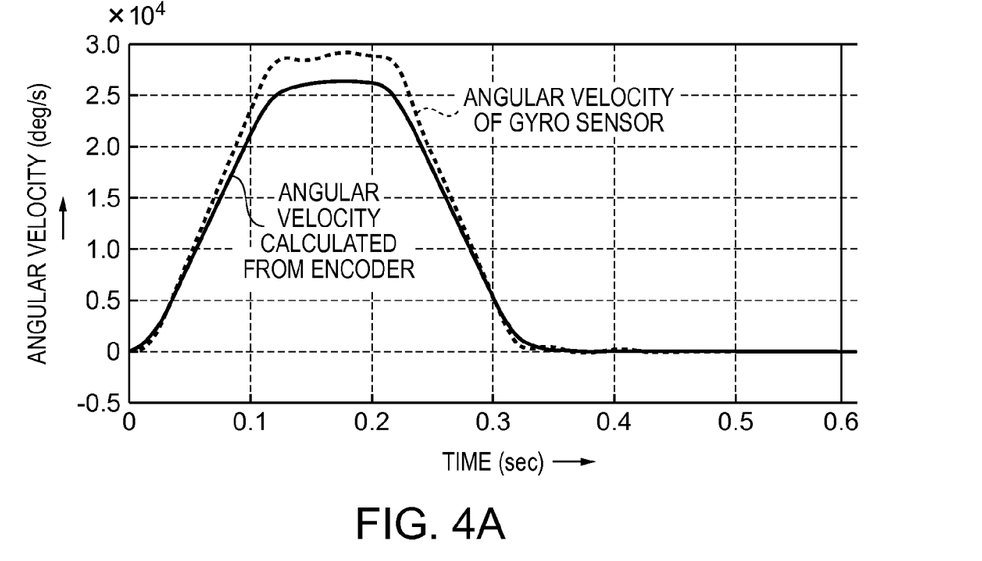
FIGS. 4A and 4B are diagrams showing data representing a relationship between the sensitivity error and the torsional angular velocity in a second case.
Figure 4B:
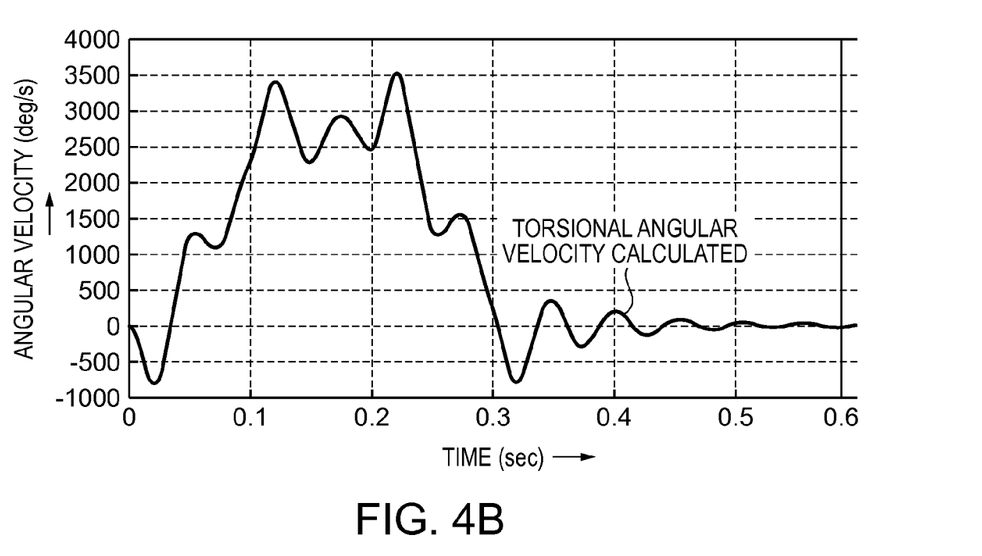

FIGS. 4A and 4B show the data representing the relationship between the sensitivity error and the torsional angular velocity in the second case, and shows that the angular velocity detected by the gyro sensor 50 includes the sensitivity error corresponding to about +10% of the angular velocity calculated from the detection value of the encoder 40 as shown in FIG. 4A. The sensitivity error corresponds to the torsional angular velocity, and the sum of the torsional angular velocity values calculated using the formula 4 described above takes a positive value, which corresponds to the sensitivity error of +10% as shown in FIG. 4B.

Third Case

Figure 5A:
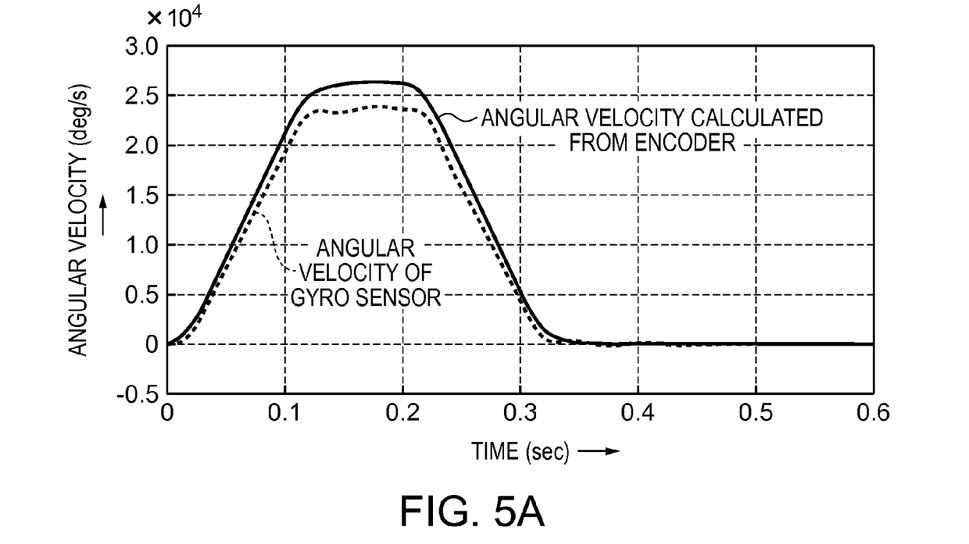
FIGS. 5A and 5B are diagrams showing data representing a relationship between the sensitivity error and the torsional angular velocity in a third case.
Figure 5B:
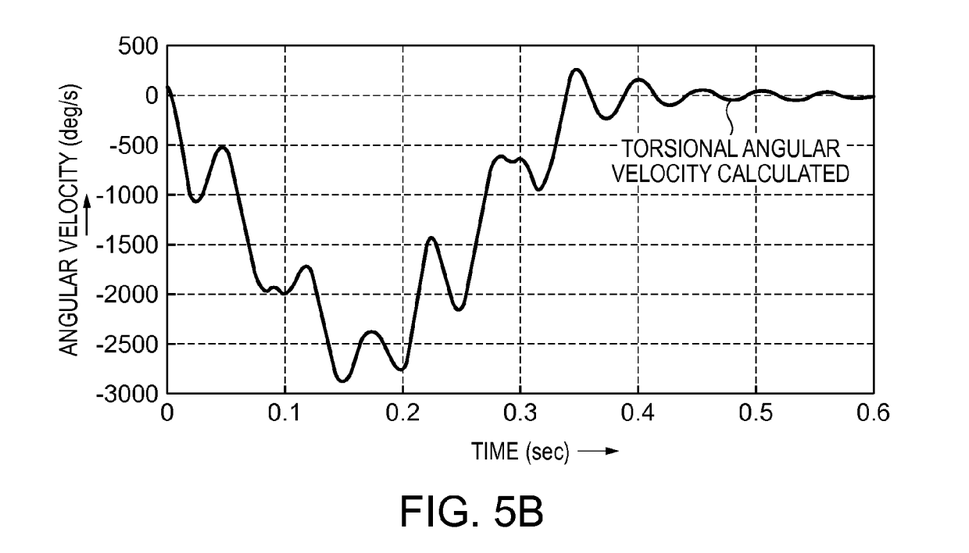

FIGS. 5A and 5B are diagrams showing data representing a relationship between the sensitivity error and the torsional angular velocity in a third case, and show the case in which the sensitivity error (the sum of the torsional component and the sensitivity error component) of −10% exists. As shown in FIG. 5B, the sum of the torsional angular velocity values calculated using the formula 4 takes a negative value, and as shown in FIG. 5A, there is shown the fact that the angular velocity detected by the gyro sensor 50 includes the sensitivity error of about −10% with respect to the angular velocity calculated from the detection value of the encoder 40.

Fourth Case

Figure 6A:
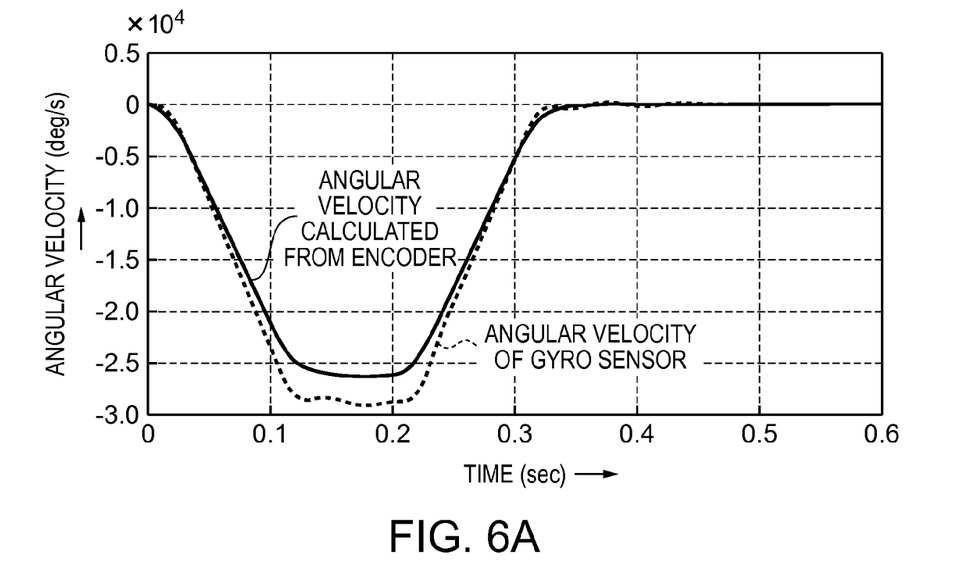
FIGS. 6A and 6B are diagrams showing data representing a relationship between the sensitivity error and the torsional angular velocity in a fourth case.
Figure 6B:
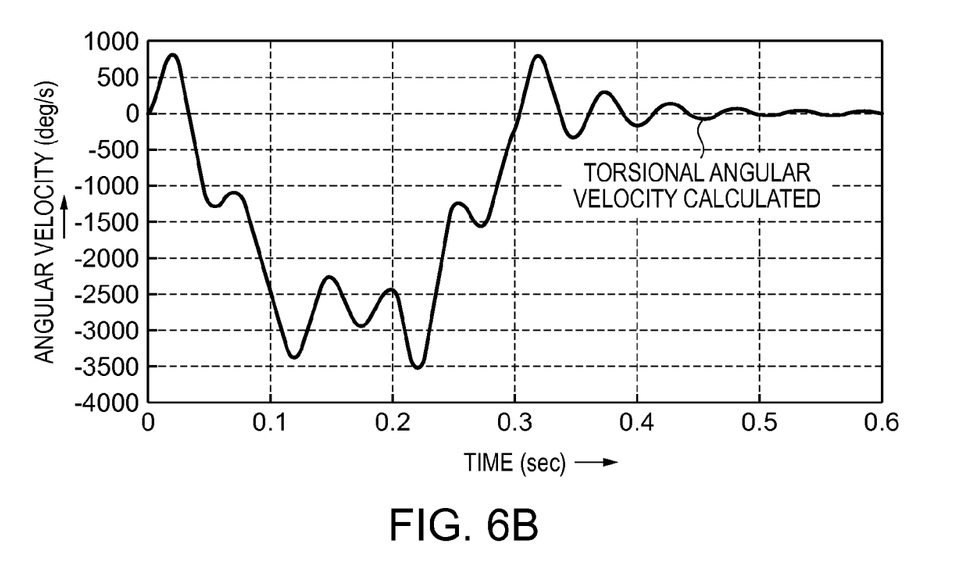

FIGS. 6A and 6B are diagrams showing the data representing a relationship between the sensitivity error and the torsional angular velocity in a fourth case. The fourth case corresponds to the case of the reverse rotation in contrast to the second case and the third case corresponding to the case of the normal rotation, and shows the case in which the sensitivity error (the sum of the torsional component and the sensitivity error component) of +10% exists. As shown in FIG. 6B, the sum of the torsional angular velocity values calculated using the formula 4 takes a negative value, and as shown in FIG. 6A, there is shown the fact that the angular velocity detected by the gyro sensor 50 includes the sensitivity error of about +10% with respect to the angular velocity calculated from the detection value of the encoder 40.

Therefore, if the sensitivity error explained hereinabove is corrected, the sensitivity error of the gyro sensor 50 caused by the arm torsion can be eliminated. Hereinafter, the method of controlling the robot using such a concept as described above will be explained with reference to a flowchart.

Figure 7:
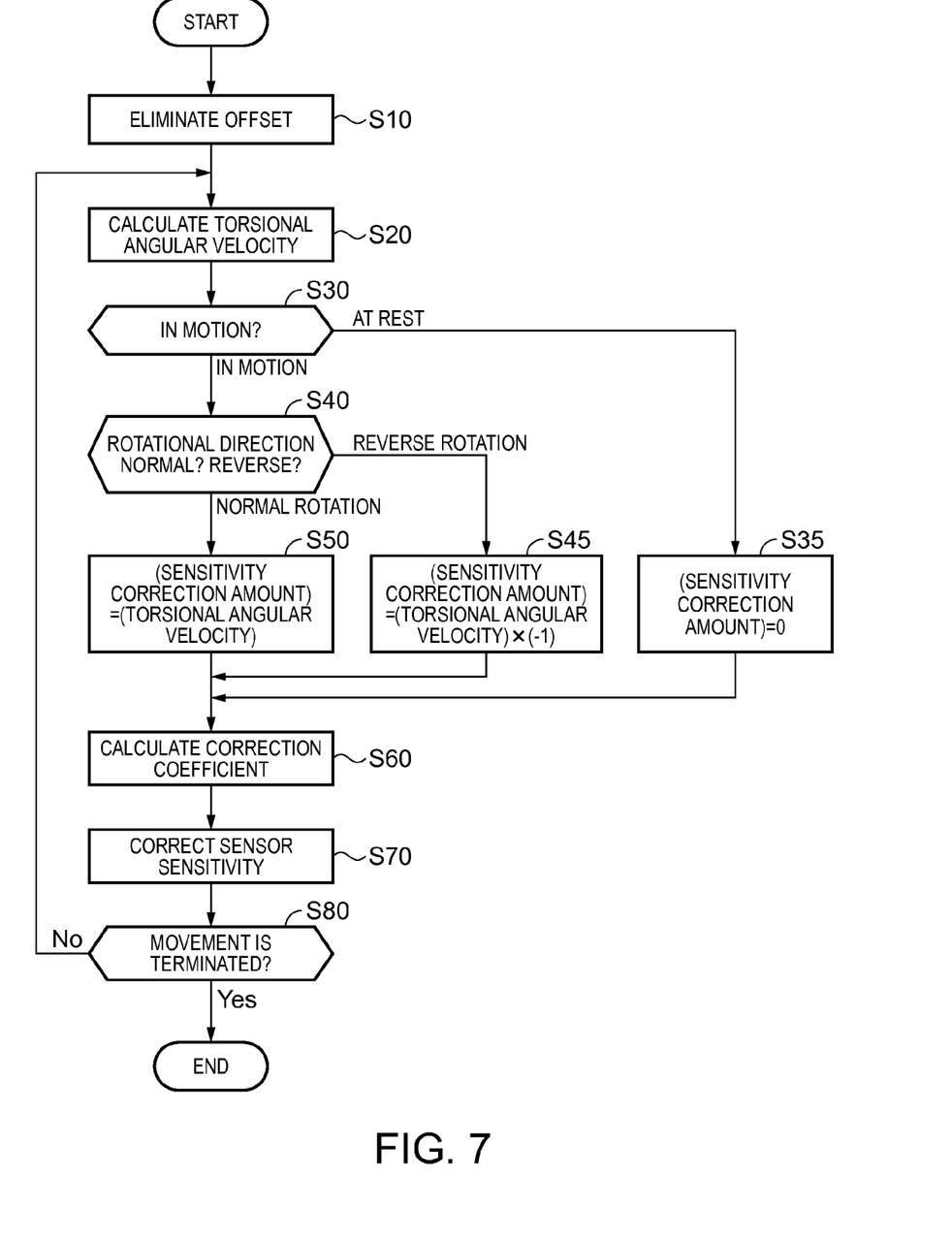
FIG. 7 is a flowchart showing major steps of a method of controlling the robot according to the first embodiment.

FIG. 7 is a flowchart showing major steps of the method of controlling the robot. Firstly, offset elimination of the gyro sensor 50 is performed (S10). In the initial state, the offset error exists in the gyro sensor 50. The offset error is an error corresponding to a value other than "0" detected by the gyro sensor 50 at rest, and by eliminating the offset error in advance, accuracy of the calculation process in the posterior step is ensured. Subsequently, the torsional angular velocity is calculated (S20). The torsional angular velocity is calculated by the formula 2 described above using the angular velocity detected by the gyro sensor 50 and the motor angular velocity (J1+J2).

Subsequently, whether the robot 10 is in motion or at rest is determined (S30). Here, in the state in which the gyro sensor 50 and both of the first encoder 42 and the second encoder 48 have no angular velocity, or in the case of the movement in which the angular velocity J1 of the electric motor 41 and the angular velocity J2 of the electric motor 47 detected by the second encoder 48 have respective direction opposite to each other and the same magnitude, it is determined that the robot 10 is at rest. If it is determined that the robot 10 is at rest, the sensitivity correction amount is set to "0" (S35), and the process proceeds to the step (S60) of correction coefficient calculation. In this case, since the sensitivity correction amount is "0," the sensitivity correction is not performed.

In the step S30, if it is determined that the robot 10 is in motion, whether the rotation of the gyro sensor 50 is positive (normal rotation) or negative (reverse rotation) with respect to the gyro sensor coordinate is determined (S40). If it is the reverse rotation, the torsional angular velocity is multiplied by (−1) (S45). Therefore, in the case of the reverse rotation, the sensitivity correction amount is set to (torsional angular velocity)×(−1), and the process proceeds to the subsequent step (S60) of the correction coefficient calculation.

If it is determined in the step S40 that the gyro sensor 50 makes the normal rotation, the sensitivity correction amount is set to be equal to the torsional angular velocity, and the process proceeds to the subsequent step (S60) of the correction coefficient calculation. Specifically, if a movement command is issued, and the angular velocity obtained by the gyro sensor 50 or the encoder 40 reaches a predetermined value, it is determined that the robot 10 is in motion. The correction coefficient is a value obtained by multiplying the sensitivity correction amount calculated in the step S45 or the step S50 by a sensitivity correction gain of the gyro sensor 50, and increases if the rotational angular velocity is high, and decreases if the rotational angular velocity is low.

Based on the sensitivity correction amount and the correction coefficient calculated in such a manner as described above, the sensitivity correction of the gyro sensor 50 is performed (S70). Then, if it is determined that the movement based on the movement command is terminated (Yes), the various calculation steps described above are stopped. On this occasion, the date calculated in the series of control steps is fed back to the control device 20, and the subsequent movement command is output with the sensitivity corresponding to the data thus calculated and corrected. Further, every time such one movement is terminated, the sensitivity of the gyro sensor 50 continues to be updated while making the robot 10 perform the movement.

If the movement by the movement command is not yet terminated in the step S80 (No), the steps on and after the step S20 are continued until the movement is terminated.

It should be noted that the offset elimination step (S10) can be performed in the sensitivity correction amount calculation step (S50 or S45).

According to the control method of the robot described above, the sensitivity correction amount of the gyro sensor 50 is determined using the difference between the angular velocity detected by the gyro sensor 50 and the angular velocity in the gyro sensor coordinate obtained from the information (the information integrating the detection value of the first encoder 42 and the detection value of the second encoder 48) detected by the encoder 40. The angular velocity difference corresponds to the torsional angular velocity. The sensitivity of the gyro sensor 50 is corrected using the sensitivity correction amount calculated in such a manner as described above, and thus the robot 10 is operated. Due to the above, it is possible to eliminate the influence of the individual difference of the gyro sensor 50 and the temperature variation exerted on the accuracy, and the influence of the aging exerted on the accuracy degradation to thereby improve the accuracy of the movement of the robot.

Further, since the sensitivity of the gyro sensor 50 continues to be updated while operating the robot 10, there is an advantage that the accuracy continues to be improved in every one movement in the case of performing a repeated movement.

Further, in the robot control method according to the first embodiment, the step (S50 or S45) of calculating the correction amount of the sensitivity error of the gyro sensor 50 is performed during the movement of the robot 10. If the calculation of the sensitivity error is performed when the robot 10 is at rest, it is possible that the noise component is accumulated, and the sensitivity error becomes different from the actual value. Therefore, by calculating the correction amount of the sensitivity error only when the robot is in motion, it is possible to suppress the influence of the noise to thereby obtain the sensitivity correction amount with high accuracy.

In the step (S50 or S45) of calculating the correction amount of the sensitivity error of the gyro sensor 50, the torsional angular velocity is calculated at predetermined time intervals during the movement of the robot 10, and then the torsional angular velocity values calculated at the time intervals described above are combined with each other to thereby calculate the correction amount of the sensitivity error after the termination of the movement. By adopting this step, the variation in the torsional angular velocity can be obtained in substantially real time, and further by calculating the correction amount every termination of one movement, the calculation load of the calculation step can be reduced.

Further, in the step (S50 or S45) of calculating the correction amount of the sensitivity error of the gyro sensor 50, the rotational direction of the gyro sensor 50 is detected, and then the value of the torsional angular velocity is switched between plus and minus in accordance with the rotational direction. In the calculation of the torsional angular velocity, there is no information related directly to the rotational direction. Therefore, the value of the torsional angular velocity thus calculated is switched between plus and minus in accordance with the rotational direction of the gyro sensor 50. According to this process, the sensitivity correction in both of the normal rotation and the reverse rotation of the gyro sensor 50 can be performed.

Further, by performing the step (S20) of calculating the torsional angular velocity after eliminating the offset of the gyro sensor 50, it is possible to eliminate the influence of the offset to thereby perform the correction of the sensitivity error with high accuracy.

The correction amount of the sensitivity error of the gyro sensor 50 is calculated using the correction coefficient corresponding to the magnitude of the movement speed of the robot 10. The correction coefficient is a value obtained by multiplying the sensitivity correction amount by the sensitivity correction gain. Therefore, in the case in which the movement speed is high, it is possible to increase the correction coefficient to thereby increase the sensitivity correction amount, and in the case in which the movement speed is low, it is possible to decrease the correction coefficient to thereby decrease the sensitivity correction amount.

Since the robot 10 using the method of controlling the robot explained hereinabove is operated while correcting the sensitivity of the gyro sensor 50, it is possible to eliminate the influence of the individual difference of the gyro sensor 50 and the temperature variation exerted on the accuracy, the accuracy degradation caused by aging, and the influence of the torsion exerted on the movement accuracy to thereby improve the movement accuracy.

It should be noted that although the robot 10 described above is explained exemplifying the case of using the three-axis robot (the scalar robot), it is possible to apply the control method of the robot described above to a six-axis robot. This point will be explained with reference to the drawings.

Six-Axis Robot

Figure 8:
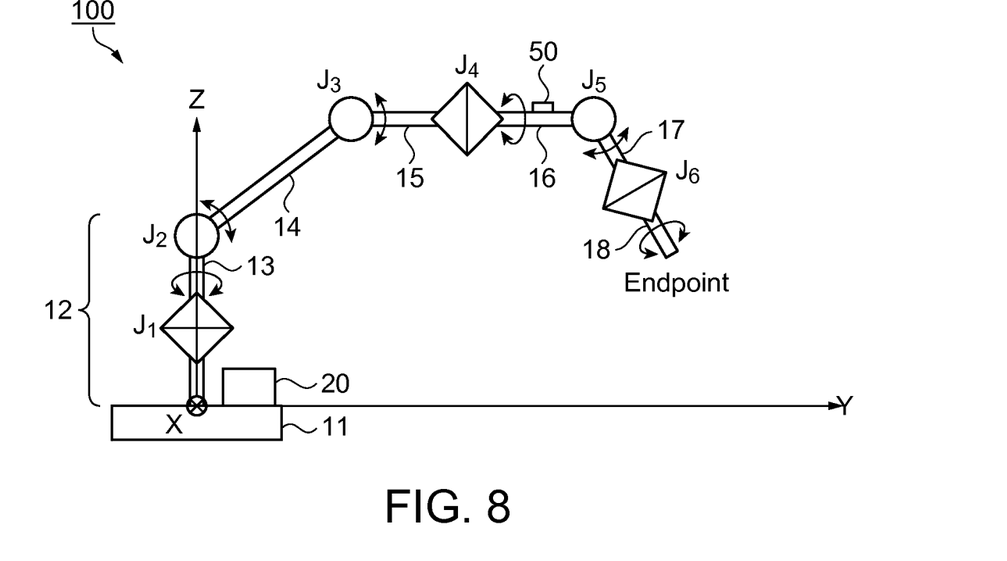
FIG. 8 is a constitutional explanatory diagram schematically showing a six-axis robot according to the first embodiment.

FIG. 8 is a constitutional explanatory diagram schematically showing a six-axis robot 100. The six-axis 100 has a platform 12 disposed on a support stage 11 having an X-Y plane so as to be perpendicular to the X-Y plane, and is composed of a plurality of joints and arms connecting the joints taking the center axis (the Z axis) of the platform 12 as a basic coordinate axis. Here, the circles and the rectangles shown in FIG. 8 each represent the joint, and the arrows attached to the joints each indicate the rotational direction. An end portion of the platform 12 is fixed to the support stage 11, and the joint $J_1$ and the joint $J_2$ are connected by the arm 13.

Further, the joint $J_2$ and the joint $J_3$ are connected by the arm 14, the joint $J_3$ and the joint $J_4$ are connected by the arm 15, the joint $J_4$ and the joint $J_5$ are connected by the arm 16, and the joint $J_5$ and the joint $J_6$ are connected by the arm 17. Further, the arm 18 is connected to the joint $J_6$, and the end point (Endpoint) of the arm 18 is provided with a finger section (not shown).

Although not shown in the drawings, the joints $J_1$ through $J_6$ are each provided with an electric motor, a reduction mechanism, and an encoder as an angular sensor for detecting the rotational angle (i.e., the rotational angle of the joint) of the electric motor. Further, the gyro sensor 50 as the inertial sensor is attached to the arm 16, and detects the angular velocity at the position where the gyro sensor 50 is attached.

It should be noted that although the gyro sensor 50 is disposed on the arm 16 in the present embodiment, the invention is not limited to the position. However, it is preferable that to dispose it at a position closer to the Endpoint if it can be attached. This is because, the vibration has larger amplitude at the Endpoint in the tip portion than in the vicinity of the platform 12.

The six-axis robot 100 is provided with the control device 20 for performing drive control of each of the motors, calculation of the angular velocity using the encoder, detection of the angular velocity using the gyro sensor 50, the variety of calculation processes described above, and so on. Further, the six-axis robot 100 performs a predetermined work in the Endpoint (e.g., the finger section) by performing relative movements using the arms 13 through 18, the electric motors and the reduction mechanisms of the joints $J_1$ through $J_6$.

Here, the calculation method of the angular velocity of the gyro sensor 50 in the six-axis robot 100 will be explained. Firstly, an inter-gyro sensor mounting position posture Jacobian matrix is calculated using the posture information in the mounting position of the gyro sensor 50 and the encoder angular velocities (the joint angles).

$$J_s = \frac{\partial p}{\partial \theta} \quad (5)$$

$J_s$: joint angle/inter-gyro sensor mounting position posture Jacobian matrix
p: posture at the mounting position of the gyro sensor
θ: joint angles (information of the encoders)

Subsequently, a coordinate system angular velocity at the mounting position of the gyro sensor is calculated using the inter-gyro sensor 50 mounting position posture Jocobian matrix $J_s$ and the joint angular velocities calculated from the joint angles.

$$\dot{p} = J_s \dot{\theta} \quad (6)$$

$\dot{p}$: coordinate system angular velocity at the mounting position of the gyro sensor
$\dot{\theta}$: joint angular velocities calculated from the joint angles By the calculation using the formula 5 and the formula 6, the torsional angular velocity is calculated from the difference between the coordinate system angular velocity at the mounting position of the gyro sensor 50 calculated from the motor angular velocities (the angular velocities of the encoders) and the output angular velocity of the gyro sensor 50, and then the sensitivity correction similar to the control method (see FIG. 7) of the three-axis robot 10 (the scalar robot) described above is performed. In other words, it is sufficient to perform the calculation (S20) of the torsional angular velocity in FIG. 7 using the formula 5 and the formula 6.

By adopting the process described above, since the six-axis robot 100 is also operated while correcting the sensitivity error of the gyro sensor 50 similarly to the three-axis robot 10, it is possible to eliminate the influence of the individual difference of the gyro sensor 50 and the temperature variation exerted on the accuracy, the accuracy degradation caused by aging, and the influence of the torsion exerted on the movement accuracy to thereby improve the movement accuracy.

It should be noted that it is possible to control the three-axis robot described above and the six-axis robot in a similar manner.

Second Embodiment

Then, a robot and a method of controlling the robot according to a second embodiment will be explained. Although in the first embodiment described above, the case using the gyro sensor as the inertial sensor is explained, the second embodiment is characterized in using an acceleration sensor. The explanation will be presented citing a linear motion robot and a six-axis robot as examples.

Firstly, the linear motion robot will be explained.

Figure 9:
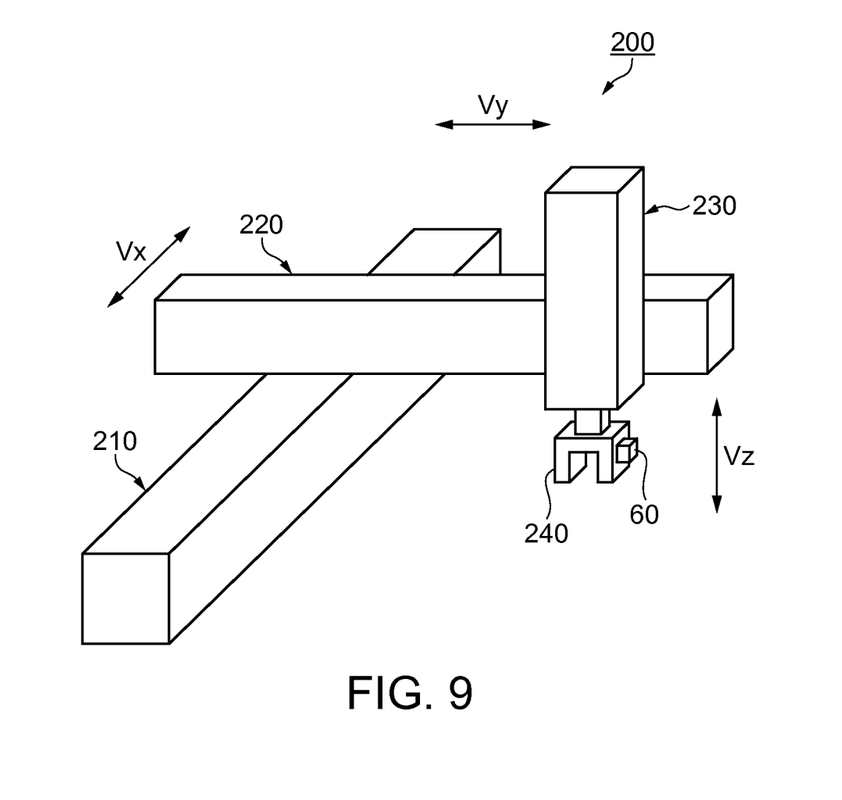
FIG. 9 is a constitutional explanatory diagram exemplifying a schematic configuration of a linear motion robot according to a second embodiment of the invention.

FIG. 9 is a constitutional explanatory diagram exemplifying a schematic configuration of the linear motion robot 200 according to the second embodiment. The robot 200 is configured including a stationary rail 210 extending in the X direction (the Vx direction shown in the drawing), an X-direction translation device 220 mounted on the stationary rail 210 and capable of moving in the X direction (the Vx direction along the stationary rail 210), a Y-direction translation device 230 mounted on the X-direction translation device 220 and capable of moving in the Y direction (the Vy direction shown in the drawing), and a Z-direction translation device 240 mounted on the Y-direction translation device 230 and capable of moving in the Z direction (the Vz direction shown in the drawing). A tip portion of the Z-direction translation device 240 is a grip section for gripping a work. The Z-direction translation device 240 is provided with an acceleration sensor 60 as the inertial sensor. The acceleration sensor 60 is a three-axis acceleration sensor capable of detecting the acceleration and the posture in each of the X direction, the Y direction, and the Z direction.

The X-direction translation device 220, the Y-direction translation device 230, and the Z-direction translation device 240 each have a linear actuator, and are provided with detectors for detecting moving speed in the X direction, the Y direction, and the Z direction, respectively. As the detectors, there are provided encoders 40 for detecting a linear motion system or a rotary system (both not shown).

Subsequently, a configuration of the control device 120 according to the second embodiment will be explained.

Figure 10:
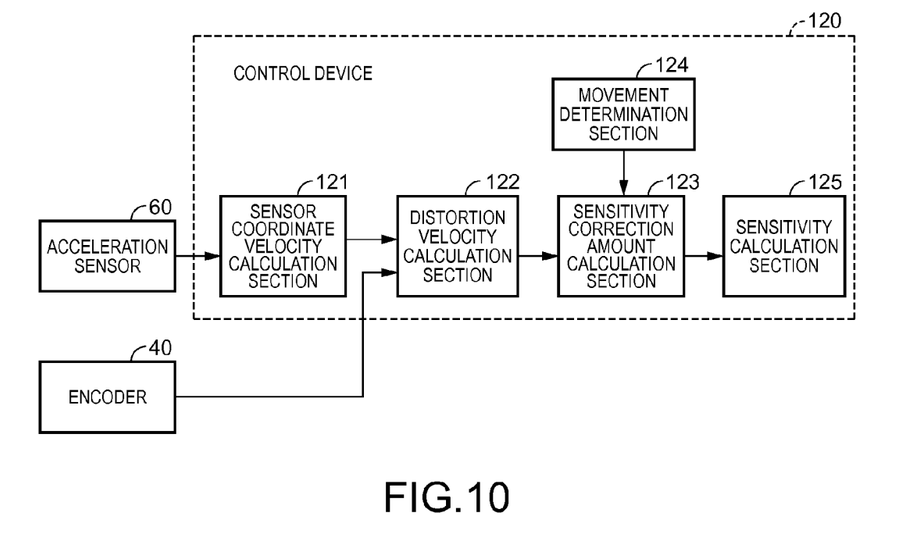
FIG. 10 is a constitutional explanatory diagram showing major constituents of a control device according to the second embodiment.

FIG. 10 is a constitutional explanatory diagram showing major constituents of the control device 120 according to the second embodiment. The control device 120 is provided with a sensor coordinate velocity calculation section 121 for obtaining the detection value of the acceleration sensor 60 and calculating the velocity and the sensor coordinate, a distortion velocity calculation section 122 for calculating the difference (referred to as a distortion velocity) between the velocity detected by the encoder 40 and the velocity calculated by the sensor coordinate velocity calculation section 121, a sensitivity correction amount calculation section 123 for calculating the sensitivity correction amount of the acceleration sensor 60, a sensitivity calculation section 125 for correcting the sensitivity of the acceleration sensor 60 based on the sensitivity correction amount thus calculated, and a movement determination section 124 for determining whether the robot 200 is in motion or at rest.

Then, a configuration of the sensor coordinate velocity calculation section 121 will be explained.

Figure 11:
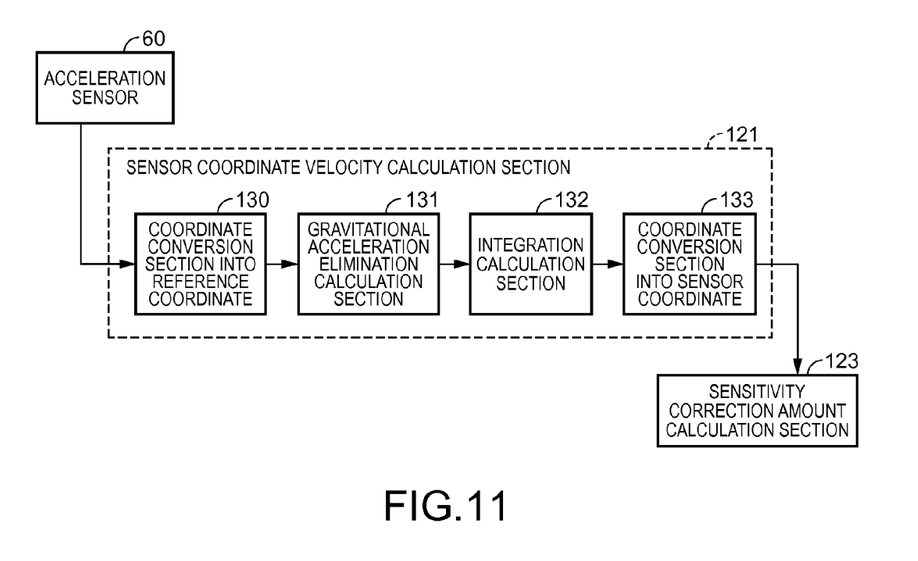
FIG. 11 is a constitutional explanatory diagram showing a configuration of a sensor coordinate velocity calculation section according to the second embodiment.

FIG. 11 is a constitutional explanatory diagram showing a configuration of the sensor coordinate velocity calculation section 121. The sensor coordinate velocity calculation section 121 is composed of a coordinate conversion section 130 into a reference coordinate for performing the conversion into the reference coordinate of the robot 200 using the detection value of the acceleration sensor 60, a gravitational acceleration elimination calculation section 131 for eliminating the influence of the gravitational acceleration from the detection value (the acceleration and the translation direction) of the acceleration sensor 60, an integration calculation section 132 for converting the acceleration with the gravitational acceleration eliminated into the velocity, and a coordinate conversion section 133 into the sensor coordinate. Here, the sensor coordinate corresponds to the gyro sensor coordinate described in the first embodiment described above.

Then, the distortion velocity will be explained. It is assumed that the linear motion velocities in the X direction, the Y direction, and the Z direction calculated from the angle information of the encoder 40 are Vmx, Vmy, and Vmz, respectively, and the X-direction acceleration detected by the acceleration sensor 60 is ax, the Y-direction acceleration is ay, and the Z-direction acceleration is az. By integrating the value obtained by eliminating the gravitational acceleration component from the acceleration detected by the acceleration sensor 60, the X-direction velocity Vsx, the Y-direction velocity Vsy, and the Z-direction velocity Vsz can be obtained. Therefore, the distortion velocity is calculated from the difference between the velocity (Vmx, Vmy, and Vmz), which can be obtained by the encoder 40, and the velocity (Vsx, Vsy, and Vsz) obtained by the acceleration sensor 60.

Then, a method of controlling the robot 200 according to the second embodiment will be explained.

The control method of the robot 200 has a step of calculating the velocity of the sensor coordinate system using the acceleration detected by the acceleration sensor 60, a step of calculating the distortion velocity from the difference between the velocity of the sensor coordinate system detected by the encoder 40 and the velocity of the sensor coordinate system calculated using the acceleration, a step of calculating the sensitivity correction amount of the acceleration sensor 60 using the distortion velocity, and a step of correcting the sensitivity of the acceleration sensor 60 using the sensitivity correction amount. In each of the steps of the flowchart showing the major steps of the control method shown in FIG. 7, it is possible to provide the explanation replacing the "torsional angular velocity calculation (S20)" of the rotary system with the "distortion velocity calculation" of the linear motion system calculated by the calculation method described above. Further, it is possible to replace the "determination of the rotational direction (S40)" with the "determination of the translation direction."

Subsequently, the six-axis robot will be explained.

Figure 12:
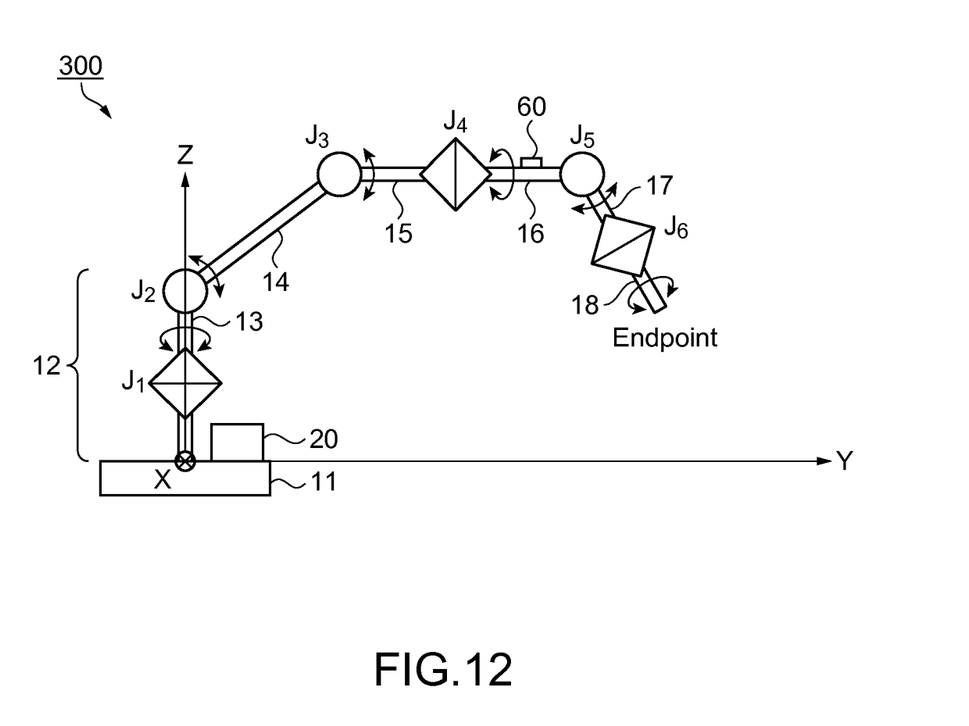
FIG. 12 is a constitutional explanatory diagram schematically showing a six-axis robot according to the second embodiment.

FIG. 12 is a constitutional explanatory diagram schematically showing the six-axis robot 300 according to the second embodiment. The configuration of the six-axis robot is the same as the configuration of the six-axis robot 100 (see FIG. 8) according to the first embodiment except the point that the gyro sensor 50 and the acceleration sensor 60 are replaced with each other, and the configurations of the control device and the sensor coordinate velocity calculation section are the same as those of the linear motion robot described above, and therefore, the detailed explanation will be omitted.

The velocity calculation method in the six-axis robot 300 will be explained. Firstly, a joint angle/inter-mounting position posture Jocobian matrix is calculated using the posture information in the mounting position of the acceleration sensor 60 and the joint angles (angle information by the encoder 40).

$$J_T = \frac{\partial p}{\partial \theta} \tag{7}$$

$J_T$: joint angle/inter-sensor mounting position posture Jacobian matrix p: posture at the mounting position of the acceleration sensor θ: joint angles (information of the encoders)

Subsequently, the coordinate system acceleration at the mounting position of the acceleration sensor 60 is calculated using the joint angle/inter-sensor mounting position posture Jocobian matrix $J_T$ and the joint angular velocities calculated from the joint angles.

$$\dot{p}=J_T\dot{\theta} \quad (8)$$

$\dot{p}$: coordinate system angular velocity at the mounting position of the sensor $\dot{\theta}$: joint angular velocities calculated from the joint angles The sensor coordinate system accelerations in three axis at the sensor mounting position obtained by the calculation using the formula 7 and the formula 8 are represented by ax, ay, and az, respectively. Further, by integrating the accelerations, the velocities of the sensor coordinate system are calculated.

It should be noted that the output value of the acceleration sensor 60 is used as the output value of the sensor coordinate system, and is therefore once converted into the acceleration of the reference coordinate system (the robot coordinate system) taking the robot platform as a reference. Subsequently, after eliminating the gravitational acceleration component, and then performing the integration to thereby calculate the velocity in the reference coordinate system, the conversion into the velocity in the sensor coordinate system is performed.

Subsequently, the distortion velocity is calculated from the difference between the velocity in the sensor coordinate system calculated from the encoder and the velocity in the sensor coordinate system calculated from the acceleration sensor.

The subsequent procedure of the sensitivity correction can be performed similarly to the case of the first embodiment (see FIG. 7). Specifically, the explanation can be presented by replacing the "torsional angular velocity" of the rotary system with the "distortion velocity" of the linear motion system calculated using the calculation method described above in each of the steps.

According to the robot control method of the second embodiment described hereinabove, the sensitivity correction amount of the acceleration sensor 60 is determined using the difference between the velocity detected by the acceleration sensor 60 and the velocity in the acceleration sensor coordinate obtained from the information detected by the encoder 40. The velocity difference corresponds to the distortion velocity. The sensitivity of the acceleration sensor 60 is corrected using the sensitivity correction amount calculated in such a manner as described above, and thus the linear motion robot 200 or the six-axis robot 300 is operated. Due to the above, it is possible to eliminate the influence of the individual difference of the acceleration sensor 60 and the temperature variation exerted on the accuracy, and the influence of the aging exerted on the accuracy degradation to thereby improve the accuracy of the movement of the robot.

Further, since the sensitivity of the acceleration sensor 60 continues to be updated while operating the linear motion robot 200 or the six-axis robot 300, there is an advantage that the accuracy continues to be improved in every one movement in the case of performing a repeated movement.

Further, in the robot control method according to the second embodiment, the step of calculating the correction amount of the sensitivity error of the acceleration sensor 60 is performed during the movement of the robot 200, 300. If the calculation of the sensitivity error is performed when the linear motion robot 200 or the six-axis robot 300 is at rest, it is possible that the noise component is accumulated, and the sensitivity error becomes different from the actual value. Therefore, by calculating the correction amount of the sensitivity error only when the robot is in motion, it is possible to suppress the influence of the noise to thereby obtain the sensitivity correction amount with high accuracy.

In the step of calculating the correction amount of the sensitivity error of the acceleration sensor 60, the distortion velocity is calculated at predetermined time intervals during the movement of the linear motion robot 200 or the six-axis robot 300, and then the distortion velocity values calculated at the time intervals described above are combined with each other to thereby calculate the correction amount of the sensitivity error after the termination of the movement. By adopting this step, the variation in the distortion velocity can be obtained in substantially real time, and further by calculating the correction amount every termination of one movement, the calculation load of the calculation step can be reduced.

Further, in the step of calculating the correction amount of the sensitivity error of the acceleration sensor 60, the translation direction of the mounting position of the acceleration sensor 60 is detected, and then the value of the distortion velocity is switched between plus and minus in accordance with the translation direction. In the calculation of the distortion velocity, there is no information related directly to the translation direction. Therefore, the value of the distortion velocity thus calculated is switched between plus and minus in accordance with the translation direction of the mounting position of the acceleration sensor 60. According to this process, the sensitivity correction in both of the forward translation and the backward translation of the acceleration sensor 60 can be performed.

Further, by performing the step of calculating the distortion velocity after eliminating the offset of the acceleration sensor 60, it is possible to eliminate the influence of the offset to thereby perform the correction of the sensitivity error with high accuracy.

The correction amount of the sensitivity error of the acceleration sensor 60 is calculated using the correction coefficient corresponding to the magnitude of the movement speed of the linear motion robot 200 or the six-axis robot 300. The correction coefficient is a value obtained by multiplying the sensitivity correction amount by the sensitivity correction gain. Therefore, in the case in which the movement speed is high, it is possible to increase the correction coefficient to thereby increase the sensitivity correction amount, and in the case in which the movement speed is low, it is possible to decrease the correction coefficient to thereby decrease the sensitivity correction amount.

Further, according to the second embodiment described hereinabove, the sensitivity of the acceleration sensor 60 is corrected using the sensitivity correction amount calculated from the distortion velocity, and thus the linear motion robot 200 or the six-axis robot 300 is operated. Due to the above, it is possible to reduce the influence of the individual difference of the acceleration sensor 60 and the temperature variation exerted on the accuracy, and the influence of the aging exerted on the accuracy degradation to thereby improve the accuracy of the movement of the robot.

The entire disclosure of Japanese Patent Application No. 2012-009695 filed Jan. 20, 2012 is expressly incorporated by reference herein.

What is claimed is:

1. A method of controlling a robot including a motor, an angular sensor adapted to detect a rotational angle of the motor, an arm connected to the motor, and an inertial sensor attached to the arm, the method comprising:

calculating a torsional angular velocity of the arm using a difference between an angular velocity detected by the inertial sensor and an angular velocity in an inertial sensor coordinate obtained from angle information detected by the angular sensor;

calculating a correction amount of sensitivity of the inertial sensor using the torsional angular velocity; and correcting the sensitivity of the inertial sensor using the correction amount.

2. The method of controlling the robot according to claim 1, wherein
the calculating of a correction amount is performed during a movement of the robot.

3. The method of controlling the robot according to claim 1, wherein
in the calculating of a correction amount, the torsional angular velocity is calculated at predetermined time intervals during a movement of the robot, and a correction amount of a sensitivity error is calculated from a sum of values of the torsional angular velocity, which have been calculated at the time intervals, after termination of the movement.

4. The method of controlling the robot according to claim 1, wherein
in the calculating of a correction amount, a rotational direction of the motor is detected, and then a value of the torsional angular velocity is switched between plus and minus in accordance with the rotational direction.

5. The method of controlling the robot according to claim 1, further comprising:
eliminating an offset error of the inertial sensor,
wherein the calculating of a torsion angular velocity is performed after the eliminating of an offset error.

6. The method of controlling the robot according to claim 1, wherein
in the calculating of a correction amount, the correction amount is calculated using a correction coefficient of the sensitivity of the inertial sensor corresponding to an absolute value of a movement speed of the robot.

7. A robot comprising:
a motor;
an arm connected to and driven by the motor;
an angular sensor adapted to detect a rotational angle of the motor;
an inertial sensor attached to the arm;
a torsional angular velocity calculation section adapted to calculate a torsional angular velocity of the arm using a difference between an angular velocity detected by the inertial sensor and an angular velocity in an inertial sensor coordinate obtained from information detected by the angular sensor;
a sensitivity correction amount calculation section adapted to calculate a sensitivity correction amount of the inertial sensor;
a sensitivity correction section adapted to correct sensitivity using the sensitivity correction amount calculated by the sensitivity correction amount calculation section; and
a movement determination section adapted to determine movement of the arm.

8. A method of controlling a robot comprising:
calculating a velocity of a sensor coordinate system using an acceleration detected by an acceleration sensor;
calculating a distortion velocity from a difference between a velocity of a sensor coordinate system detected by a velocity sensor and a velocity of a sensor coordinate system calculated using the acceleration;
calculating a correction amount of sensitivity of the acceleration sensor using the distortion velocity; and
correcting the sensitivity of the acceleration sensor using the correction amount.

9. The method of controlling the robot according to claim 8, wherein
the calculating of a correction amount is performed during a movement of the robot.

10. The method of controlling the robot according to claim 8, wherein
in the calculating a correction amount, the distortion velocity is calculated at predetermined time intervals during a movement of the robot, and a correction amount of a sensitivity error is calculated from a sum of values of the distortion velocity, which have been calculated at the time intervals, after termination of the movement.

11. The method of controlling the robot according to claim 8, wherein
in the calculating a correction amount, a translation direction of a mounting position of the acceleration sensor is detected, and then a value of the distortion velocity is switched between plus and minus in accordance with the translation direction.

12. The method of controlling the robot according to claim 8, further comprising:
eliminating an offset error of the acceleration sensor,
wherein the calculating of a distortion velocity is performed after the eliminating of an offset error.

13. The method of controlling the robot according to claim 8, wherein
in the calculating of a correction amount, the correction amount is calculated using a correction coefficient of the sensitivity of the acceleration sensor corresponding to an absolute value of a movement speed of the robot.

* * * * *